United States Patent
Ponnuswamy et al.

(10) Patent No.: US 11,811,917 B2
(45) Date of Patent: Nov. 7, 2023

(54) SYSTEM AND METHOD FOR SECURE AUTHENTICATION OF BACKUP CLIENTS USING SHORT-TERM TOKENS

(71) Applicant: EMC IP Holding Company LLC, Hopkinton, MA (US)

(72) Inventors: Senthil Ponnuswamy, San Jose, CA (US); Donna Barry Lewis, Holly Springs, NC (US); Andrew R. Huber, Chapel Hill, NC (US); Naveen Rastogi, San Jose, CA (US); George Mathew, Belmont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 202 days.

(21) Appl. No.: 17/368,093

(22) Filed: Jul. 6, 2021

(65) Prior Publication Data
US 2023/0009739 A1    Jan. 12, 2023

(51) Int. Cl.
*H04L 9/08* (2006.01)
*H04L 9/32* (2006.01)

(52) U.S. Cl.
CPC .......... *H04L 9/0825* (2013.01); *H04L 9/3213* (2013.01); *H04L 9/3263* (2013.01)

(58) Field of Classification Search
CPC .... H04L 9/0825; H04L 9/3213; H04L 9/3263
See application file for complete search history.

(56) References Cited

U.S. PATENT DOCUMENTS

| 10,880,076 | B1* | 12/2020 | Blankstein | H04L 9/0866 |
| 2013/0219456 | A1* | 8/2013 | Sharma | H04L 9/0894 726/1 |
| 2014/0164776 | A1* | 6/2014 | Hook | G06F 21/6218 713/171 |
| 2016/0055064 | A1* | 2/2016 | Gostev | G06F 21/629 726/4 |
| 2016/0105286 | A1* | 4/2016 | Li | H04L 9/14 380/286 |
| 2016/0112193 | A1* | 4/2016 | Li | H04L 9/0894 380/277 |
| 2016/0219034 | A1* | 7/2016 | Hintermeister | H04L 9/3226 |
| 2016/0364577 | A1* | 12/2016 | Williams | G06F 21/6245 |
| 2017/0163629 | A1* | 6/2017 | Law | H04L 63/0435 |

* cited by examiner

*Primary Examiner* — J. Brant Murphy
(74) *Attorney, Agent, or Firm* — Staniford Tomita LLP

(57) ABSTRACT

Embodiments for a system and method for secure authentication of backup clients in a way that eliminates the need to create users for backup client authentication anywhere in the backup ecosystem, and which eliminates the need for credentials, such as passwords that need protection, updating and synchronization. Such embodiments use a short-term token, such as a JSON web token, for both client and server authentication within the system, and verifies that the tokens grant access using the public key corresponding to the private key assigned to the directory objects by the creator of the directory objects.

20 Claims, 4 Drawing Sheets

SYSTEM AND METHOD FOR SECURE AUTHENTICATION OF BACKUP CLIENTS USING SHORT-TERM TOKENS

TECHNICAL FIELD

This invention relates generally to large-scale data backup systems, and more specifically to securely authenticating backup clients using short-term tokens.

BACKGROUND

Data protection comprising backup and recovery software products are crucial for enterprise-level network clients. Customers rely on backup systems to efficiently back up and recover data in the event of user error, data loss, system outages, hardware failure, or other catastrophic events to allow business applications to remain in service or quickly come back up to service after a failure condition or an outage. In a typical data backup system, a large number (e.g., hundreds to thousands) of clients (data sources) send data for backup in a storage system, such as a DellEMC Data Domain device, while a backup server orchestrates the workflow for backing up the user data from the various clients.

A typical data storage system allows users (clients) to perform many different data operations, such as file modification or movement, data deletion or addition, and so on. To maintain data integrity and security, it is important to authenticate such clients, as well as the servers and storage devices. Most present authentication systems rely on user credentials (e.g., username/password) to verify the authenticity of client identities and requests. A typical workflow for backing up the user data starts with the backup server creating a directory in the storage system for the client data backup. The backup server associates a storage system user and password with the directory it created for backup clients to authenticate. The backup server then stores the storage system user credentials. Whenever a backup client needs to send the data to the storage system, the backup server will send the storage system user credentials to the backup client. The backup client then uses these credentials to authenticate itself to the storage system.

This present approach has certain disadvantages, including the fact that any changes in the credentials must be propagated to both the backup server and the backup client, and login privileges must be provided for the storage system user for any change in the credentials, which in itself is a security vulnerability.

What is needed, therefore, is a system and method for securely authenticating backup clients in a large-scale storage system that eliminates the need to create users for backup client authentication in the system, and eliminates the need for traditional credentials to be transferred among backup clients, servers, and storage devices.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer, and Data Domain Boost are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
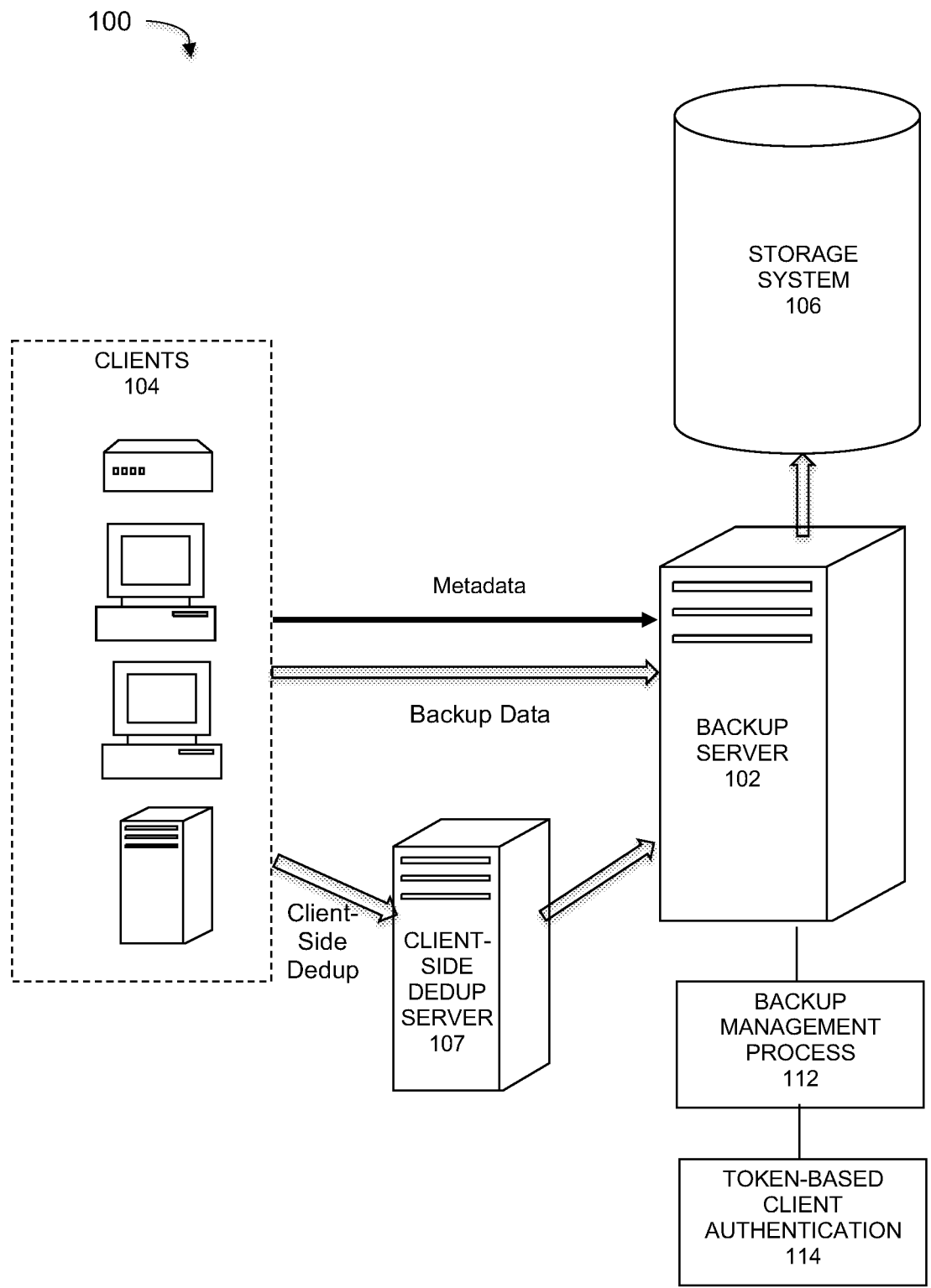
FIG. 1 is a block diagram of a data storage system implementing secure client authentication, under some embodiments.

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud based network system or very large-scale wide area network (WAN), or metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. Any such network may be implemented using protocols such as Transmission Control Protocol (TCP) and/or Internet Protocol (IP), well known in the relevant arts. In a cloud computing environment, at least some of the applications, servers and data can be partially maintained and provided through a centralized cloud computing platform.

Embodiments are described for a data storage system implementing secure client authentication by eliminating the need for any password protection, credential updating and synchronization by instead using short-term tokens for authentication and verifying those tokens to grant access using the public key corresponding to the private key assigned to the directory objects by the creator of the directory objects.

FIG. 1 is a diagram of a such a data storage system implementing secure client authentication, under some embodiments. System 100 illustrates an example of a large-scale data processing storage system that may comprise a number of server and client computers coupled together in one or more public and/or private networks. System 100 includes a backup server 102 that executes a data storage or backup management process 112 that coordinates or manages the backup of data from one or more data sources to storage devices, such as storage system 106 or any other network (primary/secondary) storage, client storage, and/or virtual storage devices that may be provided. These storage devices serve as source storage devices that hold data to be backed up from the one or more data sources, such as database or other application server and client computers.

The backup data is sourced by any number of clients 104, which might be any type of network device, computer, file system, virtual machine, data center, and so on. The data sourced by the clients may be any appropriate data, such as database data that is part of a database management system or any other appropriate application. The backup server 102 causes or facilitates the backup of client data to storage system 106, which may at least be partially implemented through storage device arrays, such as RAID components. System 100 may be implemented to provide support for various storage architectures such as storage area network (SAN), Network-attached Storage (NAS), or Direct-attached Storage (DAS) that make use of large-scale network accessible storage devices, such as large capacity disk (optical or magnetic) arrays. In an embodiment, system 100 may represent a network that includes, among other elements, a Data Domain Restorer (DDR)-based deduplication storage system, such as provided by DellEMC Corporation. However, other similar backup and storage systems are also possible.

In an embodiment, the clients 104 may send certain OS level backup metadata, log files, and other such data to the backup server 102. In an embodiment, the storage system 106 may be implemented in a DellEMC Avamar system, which is used to backup file systems, virtual machines, low change rate databases, remote offices, and various client devices 104. In this system, an Avamar server may be selected as the backup target, in which case an Avamar client on each host performs deduplication segment processing with data and metadata stored on the Avamar server. If the Data Domain (DD) system is selected as the backup target, the backup data is transferred to the DD backup server 102 and the related metadata generated by the Avamar client software is simultaneously sent to the Avamar server (in storage system 106) for storage. The metadata allows the Avamar management system to perform data restores directly from the Data Domain system without going through the Avamar server.

In an embodiment, the backup server 102 implements a deduplication backup process as a form of single-instance storage that eliminates redundant copies of data to reduce storage overhead. For deduplication, methods are used to store only one unique instance of data by replacing redundant data blocks with pointers to the unique data copy. As new data is written to a system, duplicate chunks are replaced with these pointer references to previously stored data. To service an input/output (I/O) operation initiated for deduplicated backups, the Data Domain File System (DDFS) must initiate multiple internal I/O operations, such as to lookup LP segment fingerprints, look up indexes, read container metadata, and to read the actual data before servicing the I/O to the backup application. However, the use of pointers greatly reduces the amount of data that needs to be stored.

In an embodiment, the deduplication process may be performed as a server-side process, such as by server 102. Alternatively, the deduplication process may be performed by a distributed deduplication process, such as by a client-side deduplication server 107. In an embodiment, server 107 implements the DD Boost ("Boost") protocol for performing distributed data processing and storage in large data processing and storage systems. DD Boost is a protocol offered by Data Domain for performing distributed deduplication of user data sent from a client application to a Data Domain server for persistent storage. With DD Boost, an application on a client 104 calls client library APIs that make remote procedure (RPC) calls to the Data Domain server 102. A client-side library cooperates with server-side code to perform distributed deduplication of user data to minimize the data that is actually sent to the server and to minimize the physical storage required to store the data. The architecture splits Boost into separate components, one on the client system and one on the server system. DD Boost is essentially a hybrid process, where some of the deduplication steps occur on the client and some on the server, that is, it represents a distributed deduplication method.

Although embodiments are described with respect to deduplication backup systems, embodiments are not so limited. Backup systems not using deduplication methods can also be used with the secure authentication processes and components described herein.

Likewise, example embodiments will be described in relation to a Data Domain and DD Boost architecture, however it should be noted that any other server-side, client-side, or distributed deduplication process or system that uses deduplication is also possible, as well as any data storage system that does not use deduplication, as stated above.

Although FIG. 1 illustrates an example embodiment showing one set of clients 104 and a single server 102 and storage system 106, it should be noted that system 100 may be scaled to any appropriate number of client-server computers, each with their own respective network connections to other internal or external system resources. Thus, system 100 may comprise a number of servers 106, a large number of distributed clients 120, one or more backup servers 102.

As stated earlier, in a typical data storage system with (many) multiple clients 104, some method of client verification must be implemented to ensure data integrity and security. Embodiments include a token-based client authentication process 114 to replace current credential (username/password) schemes that introduce security vulnerabilities and impose cumbersome re-certification and renewal procedures.

In a typical filesystem for a primary data use case, a directory can have multiple files with different owners. This requires each user must be authenticated for accessing a file in a directory. However, in the case of a backup, the complete directory is owned by the backup server (e.g., 102). In this case, it is sufficient to verify that: (1) the backup server is authenticated to have access to the directory, (2) the backup server has granted permission to the backup client to have access the directory, and (3) the backup client has permission to the path it wants to operate on.

As an alternative to credentials, certain file system protocols, such as NFS (Network File System) or CIFS (Common Internet File System) may be implemented in a way that they are either unsecured, or use ticket-based authentication. One such present method is Kerberos authentication that is a protocol that works on the basis of tickets to allow nodes communicating over a non-secure network to prove their identity. Such an approach requires customers to have a Kerberos implementation in their data center, which imposes significant infrastructure overhead and maintenance.

In an embodiment, the backup system 100 overcomes the disadvantages of credential and ticket-based (e.g., Kerberos) authentication by using a short-term token, such as a JSON web token (JWT) mechanism, and verifying those tokens grant access using public/private key pair. The system uses the public key assigned to the directory object with a private key that is retained by the backup server 202, and known only to the backup server. In general, the short-term token is a token that is valid for only a set, finite period of time, and once expired operations attempting to use the token will fail. Such a token has a parameter (e.g., 'expires_in') that sets the period of time, and for a JWT, the typical period is on the order of 20 minutes, though other relatively short periods of time may also be used, depending on how the token will be used. For example, for authentication, a period on the order of several minutes is sufficient, whereas for a backup or deletion operation, the period may be on the order of hours. This time period is set by the backup server 202.

The token allows the backup server 202 to define any relevant operation that may be performed by the system, such as backup operations (e.g., full, incremental, differential, etc.), data restore/moves, data deletion, and so on. Likewise, the token can restrict certain operations by not allowing such operations to be performed and/or restrict certain storage units or directories in the storage system. The token thus defines the operation to be performed (job type), expiry time, and it also carries the appropriate authentication information so that the DD device can do the appropriate access checks between the backup client and server.

A JSON web token is a compact and self-contained way of securely transmitting data over non-secure networks using digital signature that is signed using a secret or a public/private key pair. A JWT is a three-part data structure comprising a header, payload, and signature in a specific format (i.e., xxxx.yyyy.zzzz). When tokens are signed using public/private key pairs, the signature also certifies that only the party holding the private key is the one that signed it. For user authentication, once the user is logged in, each subsequent request will include the JWT, allowing the user to access network resources that are permitted with that token. Although embodiments are described with respect to use of JSON web tokens, embodiments are not so limited, and any other similar short-term token using digital signatures such as public/private keys, and with or without encryption, may be used.

Figure 2:
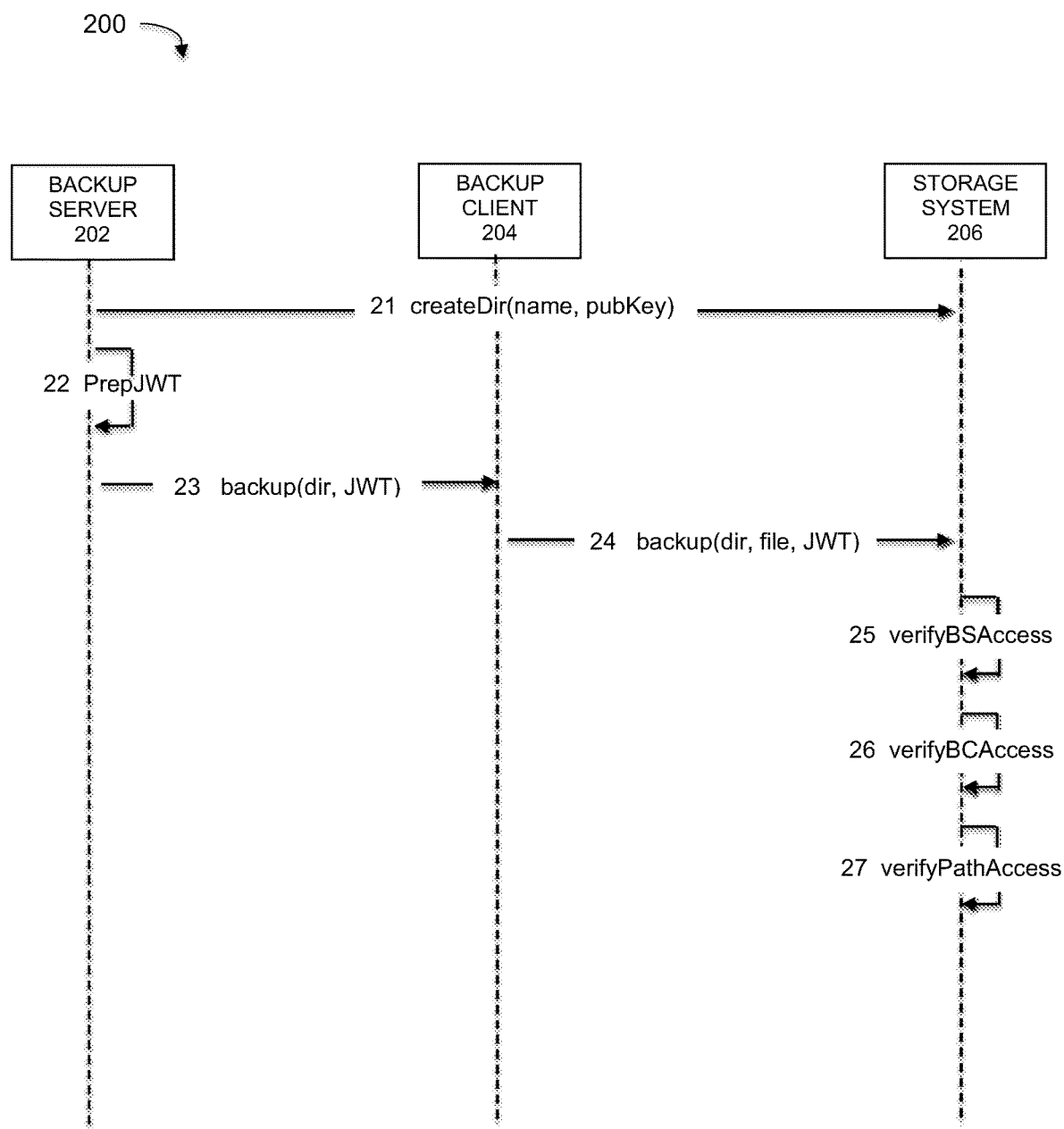
FIG. 2 illustrates a sequence of operations for a backup process using a short-term token for user authentication, under some embodiments.

FIG. 2 illustrates a sequence of operations for a backup process using a short-term token for user authentication, under some embodiments. Diagram 200 of FIG. 2 illustrates some of the processing steps among a backup server 202, a backup client 204, and a storage system 206. The process starts (step 21) with the backup server 202 sending a request to the storage system 206 to create a directory. As part of this call, it sends a public key (pubKey) to be associated with the directory. This public key establishes the backup server ownership over the directory it is creating.

For starting the backup, the backup server 202 creates the JWT (step 22) and signs it with the private key that is associated with the public key that is used in step 21. The contents of the JWT are: (a) the directory name where the backup files will be created, (b) the backup client 204 name, and (c) permissions and privileges for the backup client on the directory for more granular access, and (d) an expiration time.

In an embodiment, the backup client name corresponds to the common name (CN) or subject alternative name (SAN) of the backup client's X.509 certificate, where X.509 is a standard for a format of public key certificates, such as used in TLS (transport layer security) or SSL (secure sockets layer). An X.509 certificate contains its own public key and an identity (a hostname, or an organization, or an individual); and is either signed by a certificate authority or self-signed. When a certificate is signed by a trusted certificate authority, or validated by other means, someone holding that certificate can rely on the public key it contains to establish secure communications with another party, or validate documents digitally signed by the corresponding private key for the certificate's public/private key pair.

The backup server 202 requests the backup client 204 to start the backup and passes the directory name and the JWT (step 23). In an embodiment, the connection between the server 202 and client 204 for step 23 is over a secure link, such as a TLS connection. The TLS connection requires authentication, such as typically done using an X.509 certificate for the client.

The backup client sends a backup request to the storage system 206 and passes the JWT it received from the backup server 202 (step 24). The storage system 206 uses the public key that was associated in step 21 to ensure that the backup server 202 has valid access to the directory (step 25). The storage system will then extract the backup client name from the JWT and will compare it with the X.509 certificate's CN or SAN values. As stated above, the TLS connection requires a X.509 certificate for the client, and this is used to provide the information that is compared to the JWT information. This allows the system to prove that the client presenting the token is the client that is identified in the token. The appearance of the client name in the token by itself proves that the backup server has given permission to the named client, thus proving that this the valid client (step 26). The permission and privileges are extracted from the JWT to ensure the backup client has access to the path on which the backup client is operating (step 27). Once all the checks are done, the backup will commence.

To avoid the possibility of any interception or theft of the JWT or of a man-in-the-middle (MITM) attack all communications between and among the server 202, client 204, and storage system 306 occur over a mutually authenticated encrypted connection, such as a Transport Layer Security (TLS) or other Internet encrypted connection between the backup server and backup client. Thus, the links for steps 21, 23, and 24 can all be implemented using TLS (or similar) connections.

Figure 3:
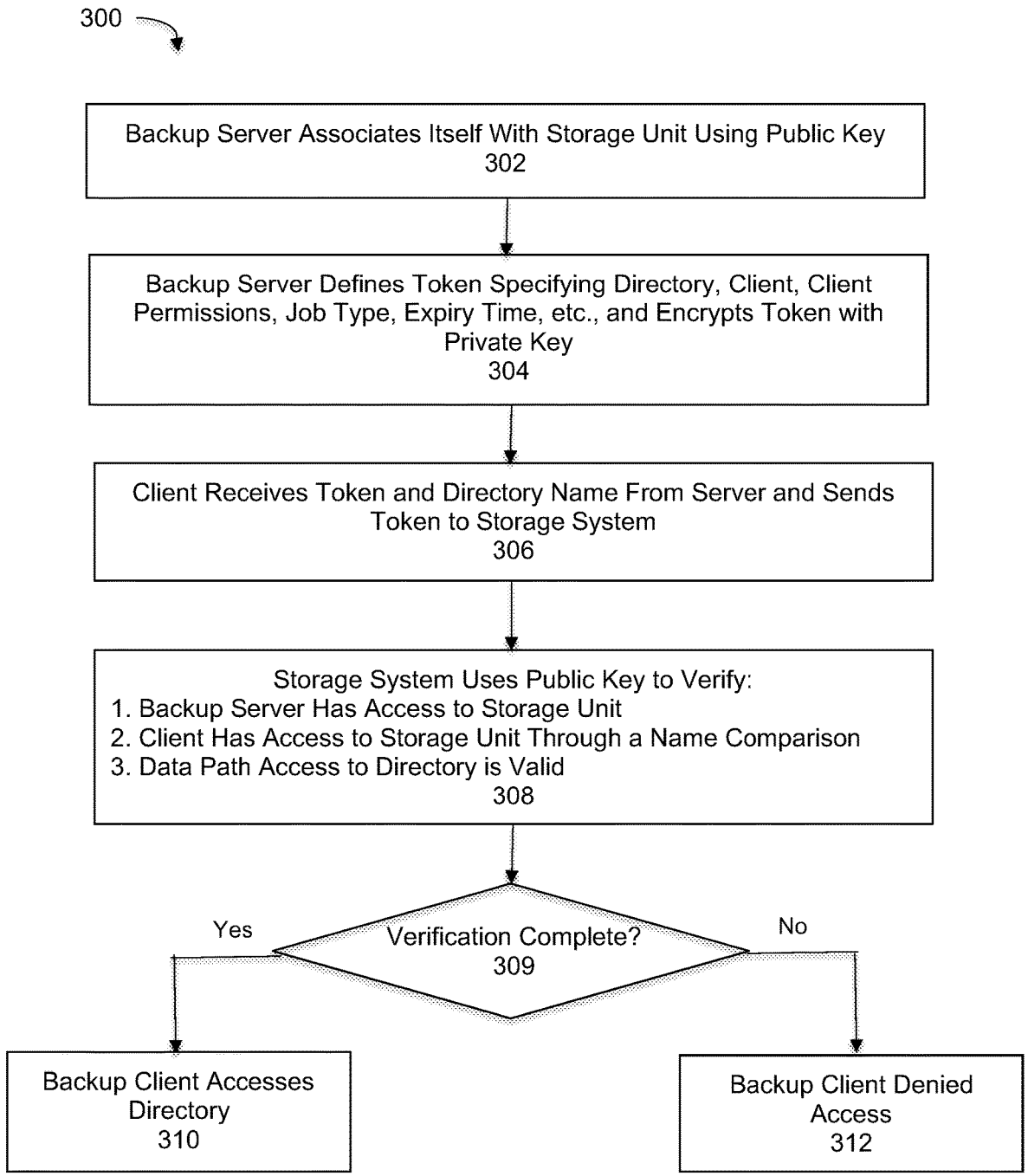
FIG. 3 is a flowchart illustrating a method of implementing secure client authentication using short-term tokens, under some embodiments.

FIG. 3 is a flowchart illustrating a method of implementing secure client authentication using short-term tokens, under some embodiments. Process 300 of FIG. 3 starts with the backup server associating itself with a storage unit of storage system 206 using a public key of a public/private key pair, 302. The backup server defines and generates a short-term token specifying relevant parameters such as storage unit directory, client name, client permissions, job type or backup operation, token expiry time, and so on, 304. The token is then encrypted with the private key of the public/private key pair. The server sends to the client 204 the token and directory name, and the client passes the token on to the storage system, 306. The storage system 206 then uses the public key provided by the server to verify that both the server and client have access to the storage unit, and the data path access to the directory is valid, 308. If any of these verification checks fails, as determined in decision block 309, the client is denied access to the directory, 312. If the verification checks all pass, the client is free to access the directory, 310.

With respect to the verification step of making sure the client requesting access is the client named in the JWT, in an embodiment, this is performed using the X.509 certificate. The name (CN or SAN) of the client is included in the X.509 certificate. This name is also included in the JWT by the server when it created the token. From the token received from the client (step 306), the storage system extracts the CN or SAN from the token. It then compares the extracted name with the CN or SAN of the X.509 of the client, and if the names match access is granted, otherwise it is denied.

The process of FIGS. 2 and 3 provide efficient authentication of clients and servers in a data storage environment in a way that eliminates any reliance on exchanged credentials, and uses a public/private key mechanism in a way that depends on minimal knowledge of the keys. The backup server 202 is the only party that knows the private and public keys since it generated the key pair. The storage system knows the public key only, and the client has no knowledge of any keys. The use of a short-term (e.g., JWT) token to contain the identifiers for the client, storage system, along with an expiration time, and the backup operation use the token to limit access requests to only validated clients and situations. In addition, the use of secure (TLS) data connections among the parties ensures data security.

Client-Side Deduplication (DD Boost) Implementation

As shown in FIG. 1, embodiments can be used in a client-side deduplication system, as typified by the Data Domain Boost environment. In an embodiment, the short-term (JWT) token method is used systems during Boost connection establishment. The identity in the client certificate (IP address and/or hostname) will be used on the Data Domain Restorer (DDR) to authenticate the connecting client. When storage units (SUs) are created on the server, a JSON Web Key Set (JWKS) will be associated with the storage unit. The JWKS indicates a set of public keys and determines who can access the storage unit. This is done by having the connecting client system provide a digitally signed JSON web token (JWT) specifying a storage unit. If the JWT was signed with the private key corresponding to the JWKS of the storage unit, then the client system is authorized to access the storage unit. This verifies that the creator of the storage unit, who assigned the public keys to the storage unit and knows the corresponding private key, has provided the JWT to the client system and has granted the client system access to the storage unit.

A UID/GID (User Identifier, Group Identifier) is also assigned to the storage unit at creation time, and this UID/GID is used when creating files and performing access checks on files. This means the UID is determined from the JWT passed to the connection call. Since the UID/GID is determined from the storage unit, there is no way to determine the UID/GID until a storage unit is known. For this reason, a storage unit must be specified when establishing a connection. This is enabled by specifying in the JWT knowledge of the storage unit to be accessed during connection establishment to allow the connection to be made to the node where the storage unit exists. Alternatively, the UID/GID could also be included in the JWT. Storing the UID directly in the JWT would allow, for example, the directory or storage unit to contain files owned by multiple UIDs, and the token would then allow access only to those files in the storage unit with matching UIDs.

In an embodiment, the client uses a ddp_connect_with_config API and parameters, and passes the following three files: a client certificate file, a client private key file, and a server certificate authority (CA) file. It should be the noted that the private key in the client private key file is the private key from the client's X.509 certificate and is part of a different key pair from the public/private key used by the backup server to sign the token. A two-way authentication is operation is done to verify the identity of the server to the client and vice-versa. A JWT will also be included as a parameter to the ddp_connect_with_config API. The JWT includes a storage unit name. The storage unit name is used to access the JWKS assigned to the storage unit at creation. The JWKS is used to verify the digital signature of the JWT. If the signature verifies, the UID/GID pair assigned to the storage unit at creation is used for the connection, and the client is allowed to access over that connection the specified storage unit. Files created using the connection will be assigned this UID/GID.

The owner of the storage unit is considered to be anyone who knows the private key(s) corresponding the JWKS assigned to the storage unit. A more general JWT scheme could allow multiple storage units to be specified in a JWT thus allowing a connection to access more than a single storage unit. A JWT could also include multiple signatures, so if multiple storage units were specified they would not all need to have the same JWKS. Multiple JWKSs could be assigned to storage units, with a different UID/GID for each JWKS. This would allow storage units to contain files owned and accessed by multiple clients, while providing secure access. A directory or file created by a client with a first JWKS would be created with the UID/GID of that JWKS, and would not be accessible to another client with a different JWKS that had a different UID/GID. Different JWKSs could share the same UID/GID, so clients could share files. The JWT or JWKS could also be extended to include access permissions. This would allow a client to be granted only selected access to an storage unit, for example, a client could have read-only access and thus be able to restore files from a storage unit, but not to write or change files in the storage unit.

After successfully connecting to a directory or storage unit via a token, the steps taken when an application opens a file are as follows. The application makes a Boost ddp_open_file call, passing as arguments to the call the connection descriptor created using the token and the pathname of the file. A remote procedure call is sent to the server to lookup the pathname and get a file handle. To verify client access, the server notes the connection was authenticated using a token. The token was saved with the server side connection information when the connection was established. The saved token is now checked to see if the token grants access to the specified pathname with the requested permission(s). If not, the open fails, but if so, a call is made to file manager to open the file with the requested access. Thus the Boost token check constitutes an extra access check. It can deny access to a file or storage unit, but it cannot allow access that the token creator does not have. The identity used by the file manager for the access check is the identity stored in the token when it was created, i.e., the identity of the token creator. If this open succeeds, it returns a file handle. The server returns a file handle to Boost, and Boost returns a file descriptor to the application.

As shown in FIG. 3, the verification step 308 involves the storage system verifying that the client has valid access to the storage unit. In an embodiment, the client name is provided in an X.509v3 certificates. One of the X.509v3 certificate extensions is the Subject Alternative Name extension. This allows for multiple additional names to be bound to the certificate. These names can be of various formats. There can be one or more additional names for each of these formats. Several types of alternative names are of interest. One is an IP address, which can be either an IPv4 address or an IPv6 address, and there can be multiple IP addresses. Next is a domain name server (DNS) name, representing the system as a host name, such as huberal-dl.datadomain.com, or an RFC 822 address, or any other name which allows an application to define a name in arbitrary format and use it in an application specific way.

A signed but unencrypted JWT always consists of three sections: (1) header (metadata); (2) payload (the data contents); and (3) signature (the signature). Both the header and payload are included in the signed data. The Boost JWT must certain information delineated below, which are all represented as "claims" in the JWT.

For an implementation, such as a Boost DD system, the JWT header allows only a few claims, two of which are needed: "alg" the signature algorithm (this is a standard JWT registered header claim). Since public/private keys are being used, the signing algorithm value must always be "R5256"=RSA digital signatures with SHA-256 HMAC. A key identifier ("kid") of the key can be used to sign the JWT. This is a user defined string, so the creator of the keys must assign this, and it should be unique among all keys created by the issuer of keys. This value must be provided to the DD server along with actual key when the storage unit is created. This is used to find the key used to verify this JWT. If only one key is allowed to be associated with a storage unit, then a kid is strictly not needed to identify the proper key to use. If the key assigned to an SU changes, the kid would change. If there is no kid, then if a storage unit's key is changed before a JWT with the old key is verified, then the verification will fail. If there are multiple keys associated with a storage unit, a kid is again not strictly necessary, since verification can be attempted using each of the storage unit's keys to see if any of them successfully verified the JWT.

The Payload claims include JWT registered claims for standards items such as expiration time and possible private claims for things like the storage unit identifiers. For an example Boost system, payload registered claims in a Boost JWT are: "iss"—the issuer of the Boost JWT, which is a string identifying the creator of the JWT; "sub"—the subject (client system), which is a string containing the IP address or other client system identifier such as host name of the client allowed to use this JWT (this must match the identity in the client certificate); "exp"—the expiration time when the JWT becomes invalid, which is an integer Posix/Unix epoch value (i.e., the number of seconds since Jan. 1, 1970); "iat" or "nbf"—the issued at time of the JWT or the not before time of the JWT, which are both integer Posix/Unix epoch values; the "issued at" value that can be used to determine that the JWT is recent, and helps prevent replay attacks where an old JWT is used; and/or the "not before time" value that is the time at which the JWT becomes valid; "aud"—the intended audience for the JWT, which is one or more string values (e.g., serial number, IP address, or hostname) identifying the DD systems with which this JWT can be used.

Certain Boost defined private claims can also be used in the payload. One such private claim is "boostsu," which is the Boost storage unit the JWT allows access to. The format of this is a string. Other appropriate private claims can also be used depending on specific implementation and use cases.

Following is an example of a valid Boost JWT, showing only the header and payload as JSON objects before encoding.

{
"alg": "RS256",
"kid": "rsa-key-000001"
}
"iss": "PPDM ver. 2.1.5-344574",
"sub": "client-test-system.datadomain.com",
"nbf": 1582574400,
"exp": 1582678800,
"aud": "DDOS-server-1.datadomain.com",
"boostsu": "storage-unit1"
}

In this example: nbf=1582574400=Monday, Feb. 24, 2020 8:00:00 PM GMT-05:00, exp=1582678800=Tuesday, Feb. 25, 2020 8:00:00 PM GMT-05:00, so the JWT is valid for 24-hours and allows access to the storage unit "storage-unit1" on the DDOS server "DDOS-server.1.datadomain.com" by client system "client-test-system.datadomain.com". The encoded external representation of a signed JWT is as three base 64 URL encoded strings separated by dots ".".

An example of Boost token format is as follows:
eyJhbGciOiJIUzIlNiIsInR5cCI6IkpXVCJ9.eyJzdWIiOiI xMjM0NTY3ODk wIiwibmFtZSI6IkpvaG4gRG91IiwiYWRtaW4iOnR ydWV9.TJVA95OrM7E2cB ab30RMHrHDcEfxjoYZgeFONFh7HgQ The above format example does not correspond to the Boost example above as it includes no key or signature. Although the values encoded in this JWT are not in the format described above for a Boost JWT token, this illustration does show the format of what would actually be passed to the Boost ddp_connect_with_config API as a byte array, with a length of 149. Note a byte array is passed, not a string. There is no terminating null character. The above code and format examples are provided for purposes of illustration only, and any other appropriate code and format may be used.

With respect to Boost JWT verification and validation by the storage system, when such a token is received, its signature must be verified and its contents must be validated. Validation is done by checking that all of the necessary claims are present with legal values. The validation steps that must be performed on the claims in a Boost JWT are provided below by claim type. If any step fails or any of the claims are not present or cannot be read, etc., the JWT is considered invalid and cannot be used to establish a connection or authorize access.

The header is validated by the claims: "alg"—the signature algorithm, and this value must always be "RS256"=RSA digital signatures with SHA-256 HMAC; and "kid"—the key identifier of the key used to sign the JWT.

The payload is validated by the claims "iss"—the issuer of the Boost JWT; "sub"—the subject (client system), which must match an identity (CN or SAN) in the client X.509 certificate, and the subject in the JWT must match one of those values; "exp"—the expiration time, which must be less than the current time (the expiration is checked only when the JWT is used to establish a connection, once the connection is established it is valid until a ddp_disconnect call is made to destroy the connection and if the exp time is reached while the connection is still open, the connection will not be terminated); "nbf"—the not before time, which must be equal to or greater than the current time and must also be less than the exp time; "aud"—the intended audience, which must match an IP address or hostname of the DD system; "boostsu"—the Boost storage unit, which must designate an existing storage unit on the DD system with one or more associated JWKs. The JWK associated with the storage unit (or one of the JWKs) must correctly verify the signature in the JWT. If a kid is required in the JWT, then it must be the JWT identified by the kid that correctly verifies the signature.

Once these Boost JWT verification checks are successfully completed, the Boost connection and access by the client to the requested storage unit is then allowed.

Embodiments thus provide a method for secure authentication of backup clients in a way that eliminates the need to create users for backup client authentication anywhere in the backup ecosystem, and which eliminates the need for credentials, such as passwords that need protection, updating and synchronization. Such a method uses short-term tokens for both client and server authentication within the system, and verifies that the tokens grant access using the public key corresponding to the private key assigned to the directory objects by the creator of the directory objects.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 4:
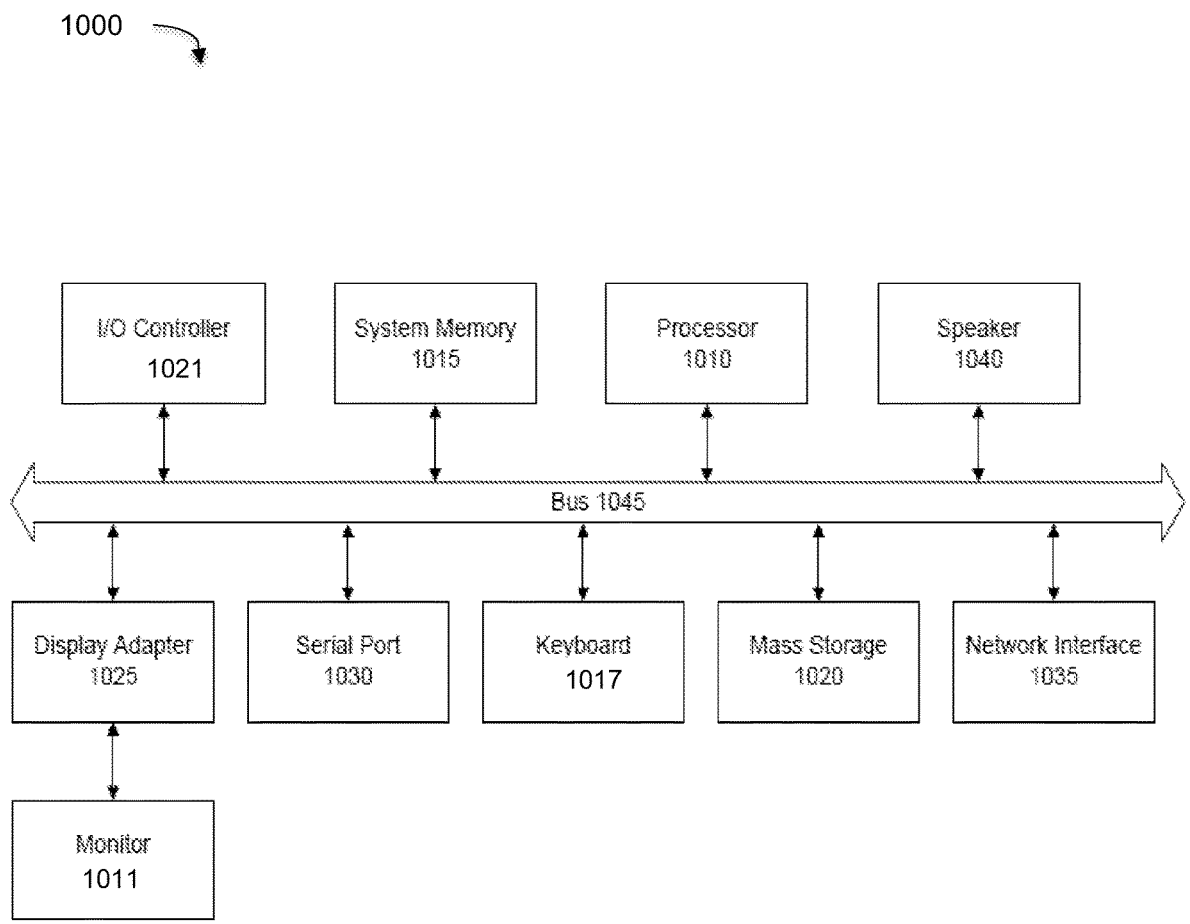
FIG. 4 is a system block diagram of a computer system used to execute one or more software components of a client-side library validation system, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 4 is a system block diagram of a computer system used to execute one or more software components of the present system described herein. The computer system 1000 includes a monitor 1011, keyboard 1017, and mass storage devices 1020. Computer system 1000 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of backing up data, comprising:
   sending, from a backup server, a request to a storage system to create a directory for storing data to be backed up for a client, with a public key to be associated with the directory;
   creating a short-term token signed with a private key associated with the public key;
   upon the client starting a backup operation, passing a name of the directory and the short-term token to the client;
   sending, from the client to the storage system, a backup request, the name of the directory, and the short-term token received from the backup server;
   using, by the storage system, the public key to ensure that the backup server has access to the directory;
   verifying, through a name comparison, that the backup server has given the permission to the client to do perform the backup operation; and
   extracting permission and privileges from the short-term token to ensure that the client has access to a file path so that the backup operation can commence.

2. The method of claim 1 wherein the public key establishes the backup server ownership over the directory it is creating.

3. The method of claim 1 wherein the short-term token comprises a JavaScript Object Notation (JSON) web token (JWT).

4. The method of claim 3 wherein the JWT comprises:
   the directory name where the backup files will be created;
   the backup client name; and
   permissions and privileges for the backup client on the directory.

5. The method of claim 4 wherein the backup client name comprises the common name (CN) or subject alternative name (SAN) of a X.509 certificate of the backup client.

6. The method of claim 5 wherein the name comparison comprises:
   extracting, by the storage system, the backup client name from the JWT; and
   comparing the extracted name with CN or SAN of the X.509 certificate.

7. The method of claim 3 wherein the backup server comprises a Data Domain server executing a deduplication backup process.

8. The method of claim 7 wherein the deduplication backup process is a distributed system at least partially having a client-side deduplication process executed by a Data Domain Boost server.

9. A method of backing up data in a computer network comprising a backup server backing up client data generated by a client to a storage system, comprising:
   associating the backup server with a directory of the storage system using a public key of a public/private key pair;
   generating, by the backup server, a short-term token specifying a storage unit, permissions for the client, a backup job type, and a token expiration time;
   encrypting the short-term token with a private key of the public/private key pair for transmission from the backup server to the client with a name of the directory;
   sending the short-term token from the client to the directory; and
   verifying, by the storage system valid access by the backup server to the directory, valid path access to the directory, and valid access by the client to the directory by comparing a client name extracted from the short-term token with a name provided in a key certificate of the client.

10. The method of claim 9 wherein the short-term token comprises a JavaScript Object Notation (JSON) web token (JWT).

11. The method of claim 10 wherein the backup client name comprises the common name (CN) or subject alternative name (SAN) of a X.509 certificate of the backup client.

12. The method of claim 9 wherein the backup server comprises a Data Domain server executing a deduplication backup process.

13. The method of claim 12 wherein the deduplication backup process is a client-side process executed by a Data Domain Boost server.

14. A system comprising:
a backup server sending a request to a storage system to create a directory for storing data to be backed up for a client in a backup operation, with a public key to be associated with the directory, and creating a short-term token signed with a private key associated with the public key;
the client receiving a backup operation request including a name of the directory and a short-term token from the backup server, and sending to a storage system the short-term token received from the backup server; and
the storage system using the public key to ensure that the backup server has access to the directory;
the storage server further verifying, through a name comparison, that the backup server has given permission to the client to do perform the backup operation and extracting permission and privileges from the short-term token to ensure that the client has access to a file path so that the backup operation can commence.

15. The system of claim 14 wherein the public key establishes the backup server ownership over the directory it is creating.

16. The system of claim 14 wherein the short-term token comprises a JavaScript Object Notation (JSON) web token (JWT), and further wherein the JWT comprises:
the directory name where the backup files will be created;
the client name; and
permissions and privileges for the client on the directory.

17. The system of claim 16 wherein the backup client name comprises the common name (CN) or subject alternative name (SAN) of a X.509 certificate of the backup client.

18. The system of claim 17 wherein the name comparison comprises:
extracting, by the storage system, the backup client name from the JWT; and
comparing the extracted name with CN or SAN of the X.509 certificate.

19. The system of claim 18 wherein the backup server comprises a Data Domain server executing a deduplication backup process.

20. The system of claim 19 wherein the deduplication backup process is a client-side process executed by a Data Domain Boost server.

* * * * *